US010614482B2

(12) United States Patent
Ungerer et al.

(10) Patent No.: US 10,614,482 B2
(45) Date of Patent: Apr. 7, 2020

(54) ATTRIBUTION OF A NEW APPLICATION INSTALLATION ON A MOBILE DEVICE BY ANALYZING NETWORK TRAFFIC OF THE DEVICE

(71) Applicant: App Annie Inc., San Francisco, CA (US)

(72) Inventors: Mark Wilson Ungerer, San Francisco, CA (US); Chang Sun, Beijing (CN); Jia Wang, Beijing (CN); Yu Chen, Beijing (CN)

(73) Assignee: App Annie Inc., San Francisco, CA (US)

( * ) Notice: Subject to any disclaimer, the term of this patent is extended or adjusted under 35 U.S.C. 154(b) by 406 days.

(21) Appl. No.: 15/587,352

(22) Filed: May 4, 2017

(65) Prior Publication Data

US 2018/0322525 A1 Nov. 8, 2018

(51) Int. Cl.
| | |
|---|---|
| *G06Q 30/00* | (2012.01) |
| *G06Q 30/02* | (2012.01) |
| *G06F 8/61* | (2018.01) |
| *H04W 12/00* | (2009.01) |
| *H04L 29/06* | (2006.01) |
| *G06F 16/951* | (2019.01) |

(52) U.S. Cl.
CPC .......... *G06Q 30/0242* (2013.01); *G06F 8/61* (2013.01); *G06Q 30/0267* (2013.01); *H04W 12/0013* (2019.01); *H04W 12/0023* (2019.01); *G06F 16/951* (2019.01); *H04L 63/0272* (2013.01)

(58) Field of Classification Search
None
See application file for complete search history.

(56) References Cited

U.S. PATENT DOCUMENTS

| | | | |
|---|---|---|---|
| 9,942,779 B1* | 4/2018 | Proctor | H04W 24/02 |
| 2005/0210035 A1* | 9/2005 | Kester | G06F 11/3476 |
| 2009/0265243 A1* | 10/2009 | Karassner | G06Q 30/02 705/14.54 |
| 2011/0196821 A1* | 8/2011 | Hellerman | G06F 16/958 707/600 |

(Continued)

OTHER PUBLICATIONS

PCT International Search Report and Written Opinion, PCT Application No. PCT/US2018/031169, dated Jul. 19, 2018, 13 pages.

*Primary Examiner* — Matthew T Sittner
(74) *Attorney, Agent, or Firm* — Fenwick & West LLP

(57) ABSTRACT

A system determines attribution of an application install on a mobile device that includes a virtual private network (VPN) application. An application executing on a mobile device may display a third party application advertisement. The VPN application detects a click on the third party application advertisements by monitoring the network requests and records a display time of the advertisement. Further, it detects the download and installation of the third party application by monitoring the network requests and comparing it against a rule from the rules dictionary, and records the installation time of the third party application. If the installation time is within a predetermined threshold time of the display time of the third party application advertisement, an attribution count is updated and is reported to an analytics engine.

12 Claims, 3 Drawing Sheets

(56) References Cited

U.S. PATENT DOCUMENTS

| | | | |
|---|---|---|---|
| 2013/0030954 A1* | 1/2013 | Liu | G06Q 30/0246 705/26.7 |
| 2013/0326476 A1 | 12/2013 | Wyatt et al. | |
| 2014/0040017 A1 | 2/2014 | Bafna et al. | |
| 2014/0052543 A1* | 2/2014 | Kim | G06Q 30/0241 705/14.69 |
| 2014/0074601 A1 | 3/2014 | Delug | |
| 2014/0207900 A1 | 7/2014 | Liu et al. | |
| 2014/0259168 A1* | 9/2014 | McNamee | G06F 21/566 726/23 |
| 2014/0280134 A1* | 9/2014 | Horen | G06Q 50/01 707/736 |
| 2014/0280329 A1* | 9/2014 | Beechuk | H04W 4/21 707/770 |
| 2014/0297377 A1* | 10/2014 | Bhat | G06Q 30/0276 705/14.5 |
| 2015/0052595 A1 | 2/2015 | Murphy | |
| 2015/0088607 A1* | 3/2015 | Georgoff | G06Q 30/0246 705/7.31 |
| 2015/0095140 A1* | 4/2015 | Greenzeiger | G06Q 30/0244 705/14.43 |
| 2015/0112791 A1 | 4/2015 | Jain | |
| 2015/0138385 A1* | 5/2015 | Kim | H04N 5/23216 348/211.99 |
| 2015/0143248 A1* | 5/2015 | Beechuk | H04L 67/10 715/739 |
| 2015/0262223 A1* | 9/2015 | Brown | G06Q 30/0246 705/14.45 |
| 2015/0326651 A1* | 11/2015 | Ormseth | H04L 67/22 709/204 |
| 2015/0339721 A1* | 11/2015 | Raji | G06Q 30/0248 705/14.49 |
| 2016/0019592 A1* | 1/2016 | Muttineni | G06F 16/9535 705/14.58 |
| 2016/0110775 A1* | 4/2016 | Moiz | G06Q 30/0277 705/14.73 |
| 2016/0127442 A1* | 5/2016 | Long | G06F 17/212 709/217 |
| 2017/0031659 A1 | 2/2017 | Burke et al. | |
| 2017/0053314 A1 | 2/2017 | Glover et al. | |
| 2017/0091428 A1* | 3/2017 | Johnson | G06F 21/10 |
| 2017/0230478 A1* | 8/2017 | Huang | H04L 67/327 |
| 2018/0032997 A1* | 2/2018 | Gordon | G06Q 20/3224 |
| 2018/0322525 A1* | 11/2018 | Ungerer | G06Q 30/0242 |

\* cited by examiner

ATTRIBUTION OF A NEW APPLICATION INSTALLATION ON A MOBILE DEVICE BY ANALYZING NETWORK TRAFFIC OF THE DEVICE

BACKGROUND

This invention relates generally to the field of attribution of mobile application installations on a mobile device, and in particular to attribution by a network access application running on the mobile device that analyzes the device's network traffic to detect impressions.

Mobile devices such as mobile phones and tablets have many mobile applications installed on them. Many mobile applications are free to download or charge a minimal fee for downloading the application. Mobile applications often make money by advertising within their application, which advertising is often encouraging a user to install additional mobile applications on the device. The applications that provide the advertising may be referred to as publisher applications, as they publish ads to the user. A publisher application may be paid for serving ads in a variety of ways. For example, some publisher applications are paid for an impression, which occurs when the publisher application displays a particular content item (e.g., an advertisement) within the mobile application. In other examples, the publisher application is paid when a user takes an action following the impression, such as a click on the third party application advertisement, an installation of another mobile application, or any other observable other user event.

It is often desirable to measure the effectiveness of a marketing campaign on a mobile application. For marketing campaigns where the goal is for the user to install an application on the mobile device, measuring the effectiveness of a campaign may involve detecting that a mobile application was installed following an impression of a particular advertisement. The installation is a conversion event, which is attributed to the impression according to an attribution model.

Detecting the impression and conversion and applying the attribution model is typically accomplished by the publisher application and/or the ad server. However, an entity that is not directly involved in the advertisement process or otherwise affiliated with it typically has no way of determining whether an installation of a mobile application occurred due to an impression, in part because the entity has no visibility into the impression and or conversions. This technical limitation prevents such third party entities from computing independent analytics about application installations on a mobile device.

SUMMARY

Embodiments of the invention enable a system to compute analytics about application installations on a mobile device without being directly involved in the installation or any impressions to which the installation is attributed. For example, a network access application, such as a virtual private network (VPN) application, is provided by an entity that desires to compute analytics about application installations on the mobile device. The VPN application allows a user to securely access mobile applications included in a private network, for example, email application from an employer, documents residing on an employer server, and other such applications. Additionally, the VPN application enables access to other mobile applications that are not a part of the private network and allows the other mobile applications to send and receive data across shared or public networks, such as the Internet. The data or requests from the other mobile applications are sent via a private network interface of the VPN application.

The VPN application inspects data packets from one or more publisher applications executing on the mobile device to track impressions of ads that may be displayed by publishing application on the mobile device. More specifically, the VPN application tracks impressions by analyzing the network traffic of the publishing applications on the device. The VPN application queries the operating system of the client device periodically to determine when a new application is installed. If a new application is installed, the VPN application or a server that collects the data from the VPN application may apply an attribution model to determine if the new application install can be attributed to one or more ad impressions.

The VPN application may inspect the network requests to determine a pattern that represents a publisher application. The VPN application may store this pattern and use it later to detect one or more impressions of the advertisement (generally termed as an ad) by determining that the network requests were made by one of the publisher applications to a network address associated with the ad. Locating the network address of associated with an ad is one way of detecting an ad impression. An ad impression may be detected in other ways such as display of a particular ad or determining a location of a particular publishing application that can retrieve an ad.

The VPN application logs the detected impressions and their associated publisher application. Further, on a new application install, the VPN application logs a time of installation of the new application. The attribution model may link the application install to one or more impressions by comparing the time of installation of the new application to the time the ad impressions were logged. If the installation of an application occurs within a threshold time of the one or more impressions, the attribution model attributes the installation of the application to the logged impression and reports the determined attribution to an analytics engine.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
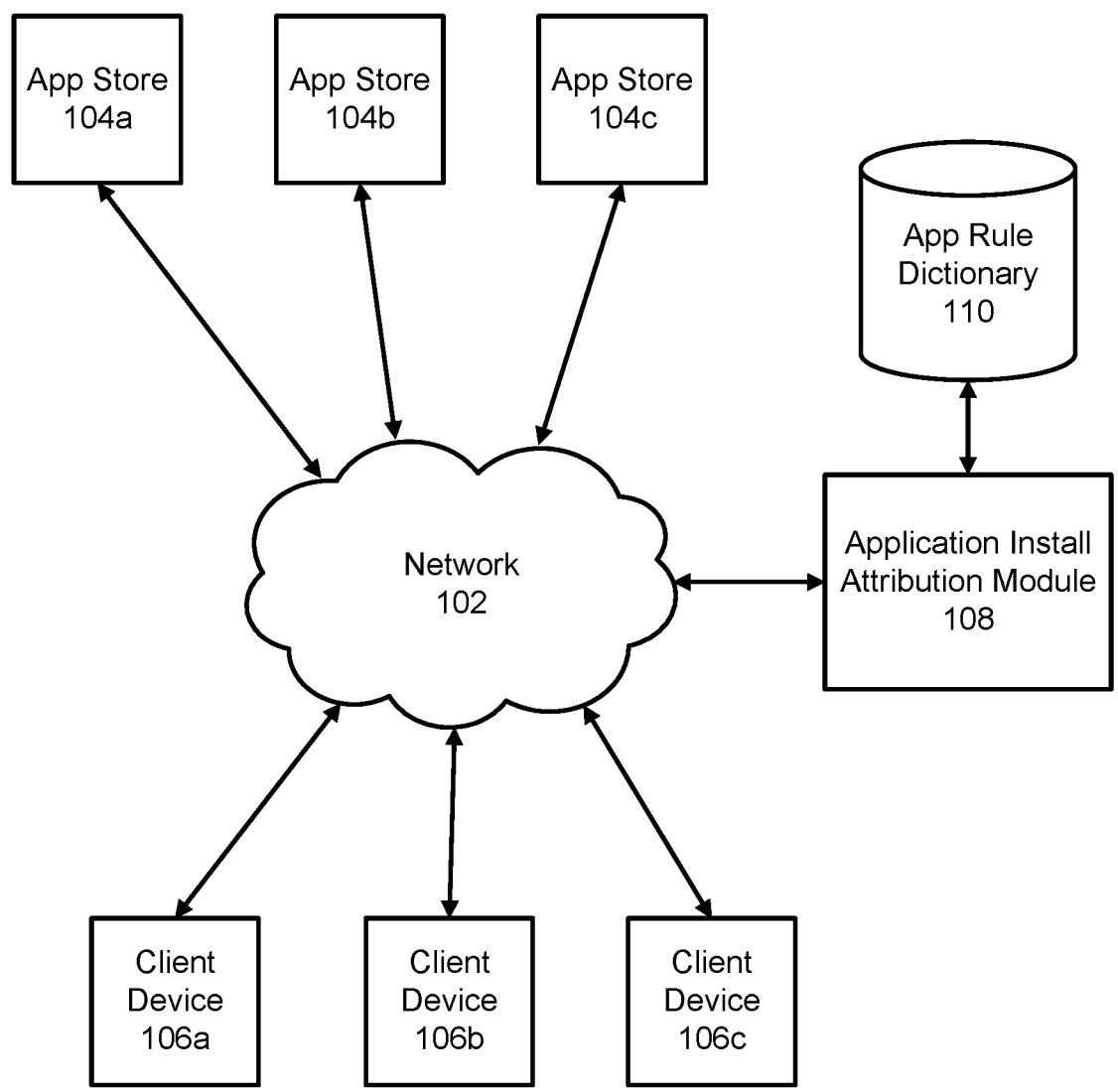
FIG. 1 is a block diagram illustrating a computing environment for application install attribution according to one embodiment of the present disclosure.

FIG. 1 is a block diagram illustrating a computing environment for application install attribution according to one embodiment of the present disclosure. The computing environment 100 shown by FIG. 1 comprises one or more client devices 106, a network 102, one or more mobile application stores 104, an application rule dictionary 110 and an application install attribution module 108. In alternative configurations, different and/or additional components may be included in the system environment 100.

The client devices 106 are one or more computing devices capable of receiving user input as well as transmitting and/or receiving data via the network 102. In one embodiment, a client device 106 is a smartphone, a tablet or a conventional computer system, such as a desktop or laptop computer. Alternatively, a client device 106 may be a device having computer functionality that accesses a set of mobile applications. A client device 106 is configured to communicate via the network 102. In one embodiment, a client device 106 executes an application allowing a user of the client device 106 to interact with the application install attribution module 108. For example, a client device 106 executes a browser application to enable interaction between the client device 106 and the application install attribution module 108 via the network 102. In another embodiment, a client device 106 interacts with the application install attribution module 108 through an application programming interface (API) running on a native operating system of the client device 106, such as IOS® or ANDROID™.

The client devices 106 are configured to communicate via the network 102, which may comprise any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 102 may be encrypted using any suitable technique or techniques. In one embodiment, the network 102 includes a VPN store.

One or more mobile application stores 104 may be coupled to the application install attribution module 108 that monitors the application stores to determine a download and install of a mobile application on that client device 106. A mobile application store 104 includes downloadable mobile applications and catalogs for the mobile applications. Exemplary mobile application stores include the Apple iOS Store, Google Play store, Amazon application store, Mac application store, Windows application store and other such stores.

The application rule dictionary 110 stores rules (e.g., regular expressions) associated with a mobile application, for example, a publisher application. To determine a rule, a VPN application downloads and installs a mobile application on a test client device 106. The test client device executes only the VPN application and the mobile application to ensure that the traffic on the network interface flows from the executing application. The VPN application monitors the test client device's 106 network traffic and identifies key patterns indicating a request to access an application store 106. In addition, a unique pattern is identified for each action such as download, re-download or update of a mobile application when accessing the application store 106. A unique string is identified for an application icon that is a part of the monitored network request. A rule identifying each of the actions, the request to an application store and an application icon are parsed from the network requests and stored in the application rule dictionary 110. The rules are used in future to events such as a download, update or re-download of an application or a request to the application store 104.

The application install attribution module 108 determines an attribution of an application installation to one or more impressions on a client device 106. The VPN application on the client device 106 monitors network requests and determines if the network requests are from a known publisher application. The application rules dictionary 110 may be used to search for a pattern associated with the network request. A mobile application executing on a client device 106 may display an ad for a third party application. The application install attribution module 108 monitors the network request from the executing mobile application to detect an ad impression by determining that the network requests were made by one of the known publisher applications to a network address associated with the ad. The network address associated with the ad may be obtained by looking at the landing page of the third party application.

Simultaneously, the application install attribution module 108 may periodically monitor the operating system of the client device 106 to detect a request to download and/or install a mobile application from an application store 104. Once a download or an install request is detected, the application install attribution module 108 logs the time of install of the mobile application on the client device 106. An attribute of the installed mobile application, such as an application icon, may be compared with a similar attribute of the landing page of the third party application to determine that the installed application is the same as the application displayed by the landing page.

Further, the logged installation time of the downloaded and installed application is compared to the logged impression time of the ad. If the installation time is within a predetermined threshold time of the impression time, for example, if the downloaded and installed application was installed within 30 seconds of the display of the advertisement, the attribution install model attributes the installation to the ad impression. The attribution count is updated and stored in a database. The attribution count is reported to an analytics engine. The analytics engine may aggregate the attributions across many devices and aggregate into a report that shows conversion information across multiple ads, publishing apps and other such attributes.

Figure 2:
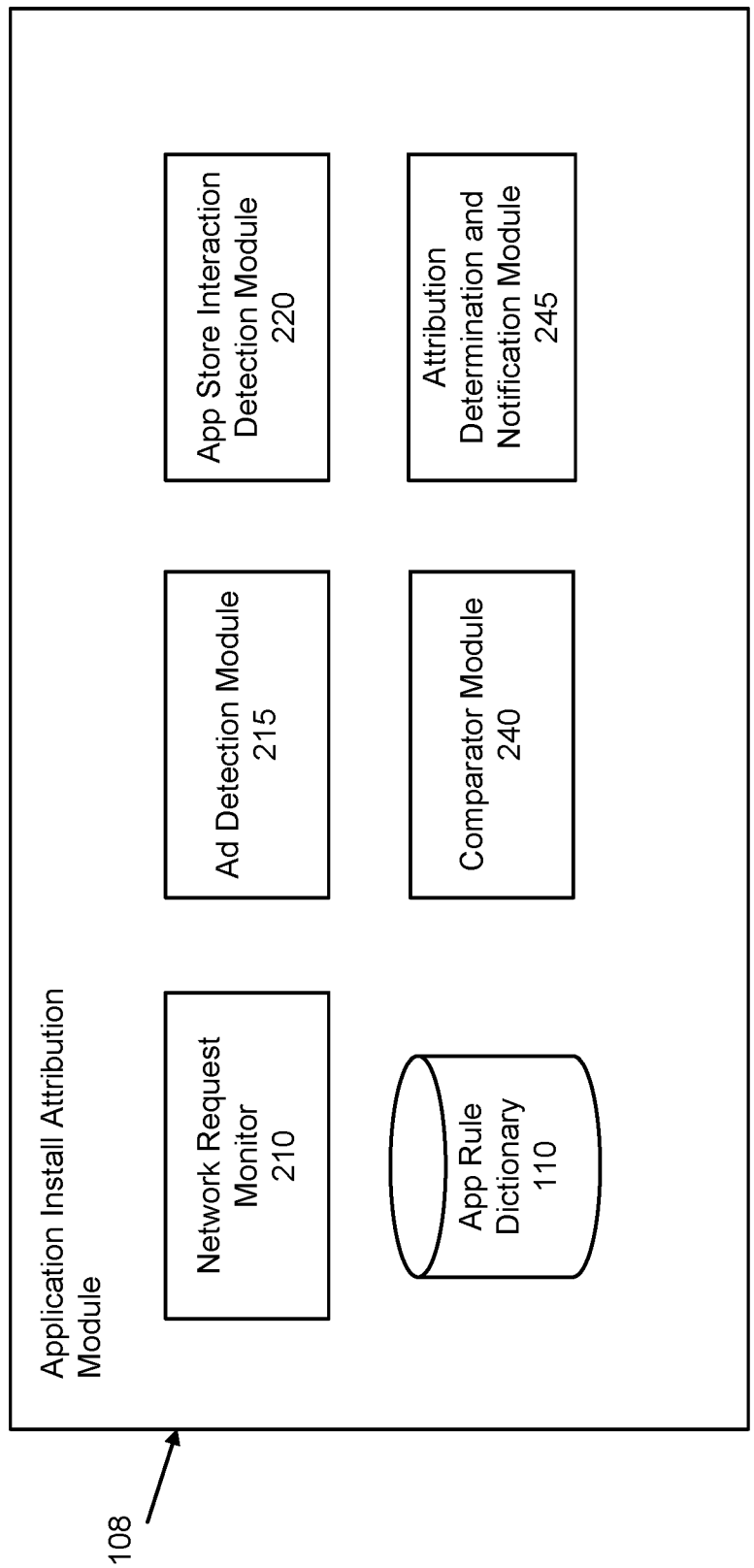
FIG. 2 is a block diagram illustrating logical components of an application install attribution module according to one embodiment of the present disclosure.

FIG. 2 is a block diagram illustrating logical components of an application install attribution module according to one embodiment of the present disclosure. The application install attribution module 108 includes a network requests monitor 210 that can retrieve data from an application rules dictionary 110, an advertisement (ad) detection module 215, an app store interaction detection module 220, a comparator module 240 and an attribution determination and notification module 245.

One or more mobile applications execute on a client device 106 that create network traffic over the VPN network interface. The network requests monitor 210 monitors the traffic and analyzes each network request. The network requests are analyzed to determine which mobile application is executing on the client device 106. To determine which mobile application is executing, the network requests monitor 210 may search for rule in the application rule dictionary 110 that matches a pattern of the monitored network request.

If a match is found, the associated mobile application name is retrieved from the rule dictionary. The executing mobile application identifier is sent to the ad detection module 215 to determine if a third-party application advertisement was displayed while the mobile application was executing.

The ad detection module 215 receives the executing mobile application identifier and the monitored requests. The ad detection module 215 analyzes the network request to detect an http request to a landing page different than the executing mobile application. If an http request is found, the ad detection module 215 determines that a third party application advertisement was displayed and clicked within the executing mobile application. The ad detection module 215 records a time of display of the third party application advertisement and sends it to the comparator module 240.

An app store interaction detection module 220 detects interactions by the device 106 with one of the application stores 104. The interactions may include, for example, a download and install of an application from one of the application stores 104, a search on an application store 104 using one or more search terms, a download of a page on which a search result has appeared, a web search using a specific search term, or any other interaction that may be tracked by the module 220. More specifically, the app store interaction detection module 220 receives monitored network requests. The network requests are parsed to identify key patterns in the requests via specific rules (regular expressions) that represent a request to an application store 104. The app store interaction detection module 220 may search for rule in the application rule dictionary 110 that matches a pattern of the monitored network request indicating a request to an application store 104. An application store 104 name may be retrieved from the application rule dictionary 110.

Once an application store 104 is determined, the app store interaction detection module 220 may further parse the monitored requests, via specific rules (e.g., search within the identified application name rules), to identify the type of action that the monitored request includes. In the example of detecting a download and install of an application, the pattern of the monitored network request may indicate a download and install request to an application store 104, an upload request to an application store 104, or an update request to an application store. If a request to download an application from the application store 104 is detected, the app store interaction detection module 220 records a time of download and installation of the application and forward it to the comparator module 240.

The comparator module 240 compares the application icon of the installed application is compared to the landing page of the third party mobile application advertisement. If the application icon of the installed application is same as the application icon displayed on the landing page of the third party mobile application, the comparator compares the time of display of a third party mobile application advertisement to the download and installation time of a mobile application. The comparator module 240 notifies the attribution determination module 245 of the result of the comparison.

If the download and install time of the mobile application is within a predetermined threshold time of the display of the third party mobile application advertisement, the attribution determination and notification module 245 updates an attribution count associated with the third party mobile application advertisement. For example, if the mobile application is downloaded and installed within 30 seconds of the display of the third party mobile application advertisement, it is inferred that the installation is a result of the display of the third party mobile application advertisement, and hence an attribution count, such as a conversion count or an application install count, may be updated or incremented to reflect the attribution. An application analytics engine is notified of the attribution count by the attribution determination and notification module 245.

Figure 3:
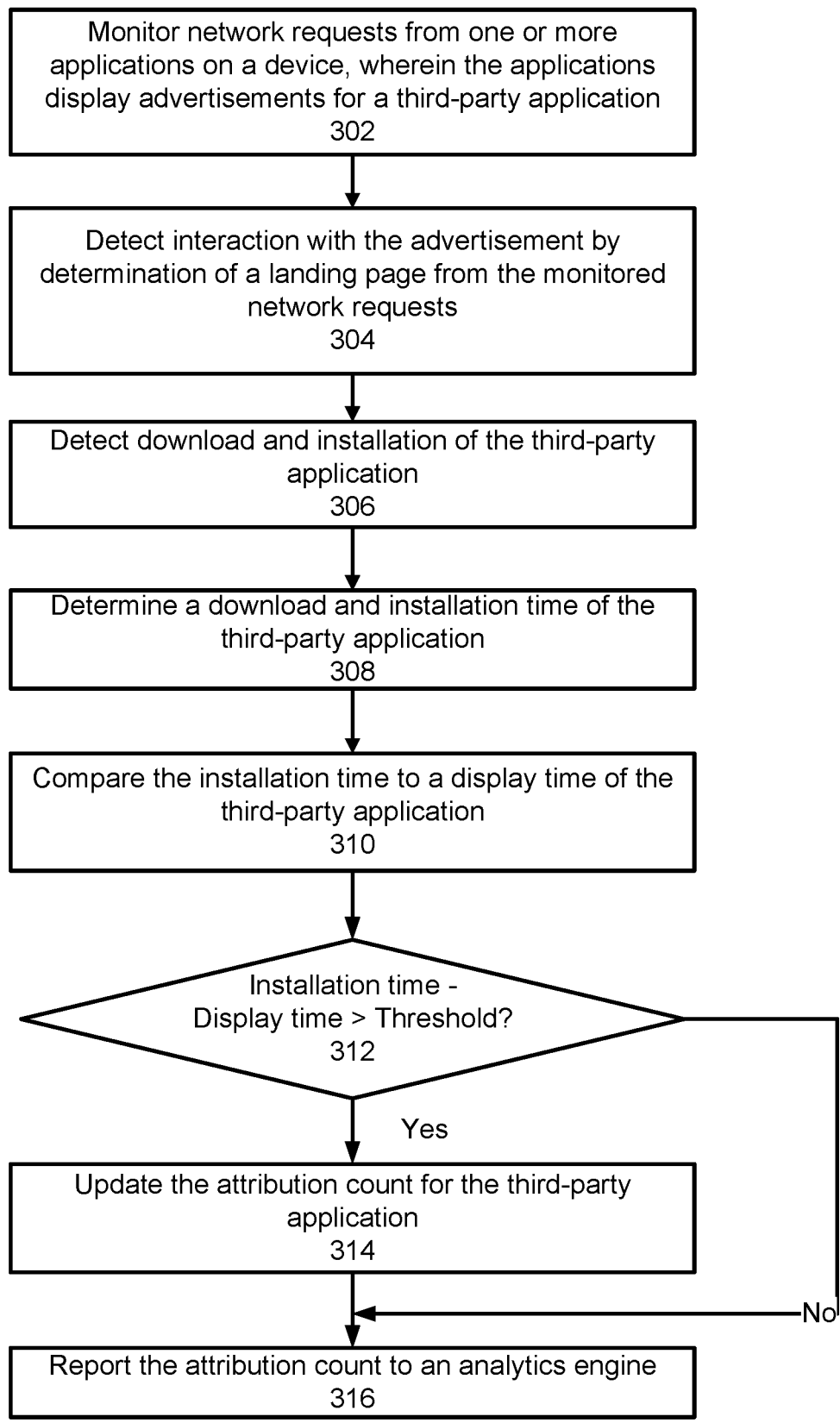
FIG. 3 is a flow diagram illustrating a method for determining an attribution count for an advertised application according to one embodiment of the present disclosure.

FIG. 3 is a flow diagram illustrating a method for determining an attribution count for an advertised application according to one embodiment of the present disclosure. The application install attribution module 108 monitors 302 the network requests from one or more mobile applications executing on a client device 106. The executing mobile application may display third-party mobile application advertisements. The monitored network requests are analyzed to detect 304 an interaction with the third party application advertisement (e.g., an impression or click) by determining a landing page portion within the monitored network request. The time of display of the third party application advertisement is recorded on detection of the click.

Simultaneously, the application install attribution module 108 monitors the network requests to detect 306 a download and installation of a mobile application. The downloaded application is compared to the third party application displayed by the advertisement to verify that the downloaded and installed application is the third party application, for example, an application icon of the downloaded mobile application may be compared to the application icon displayed on the landing page of the third party application to ensure a match. On verification that the downloaded and installed application is the third party application, a download and installation time of the third party application is determined 308.

The download and installation time of the third party application is compared 310 to the display time of the third party application advertisement. If the download and installation time is within 312 a pre-determined threshold time of the display time, an attribution count, for example, a conversion count, for the third party application is updated 314. In other embodiments, other attribution models may be used. If the download and installation time is not within the pre-determined threshold time of the display time, the attribution count is not updated. In either case, the attribution count is reported 316 to an analytics engine. The analytics engine may further use to analyze the results of marketing via the display of third party application advertisements.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for attributing an application install on a device, the method comprising:
   monitoring network traffic including network requests from one or more publisher applications on a mobile device, wherein the one or more publisher applications display an advertisement for a third-party application;
   detecting one or more impressions of the advertisement by determining that the network requests were made by one of the publisher applications to a network address associated with the advertisement;
   logging the detected impressions and their associated publisher applications;
   detecting an installation of the third-party application on the mobile device, wherein the installation is detected by:
      searching a rules dictionary for a rule having a regular expression that identifies a request to access an application store and applying the rule to the monitored network traffic to find a match; and
      identifying an installation event for the third-party application, from the matched monitored network traffic, by comparing an installation event identifier of the rule to the matched monitored network traffic;
   logging a time of the installation of the third-party application on the mobile device;
   determining an attribution of the installation of the third-party application to one or more of the impressions by applying an attribution model to the logged installation and the logged impressions; and
   reporting the determined attribution to an analytics engine.

2. The method of claim 1, wherein detecting an advertisement further includes detecting a network request to the mobile application displayed in the advertisement.

3. The method of claim 2, further comprising determining a landing page for the detected network request to the mobile application.

4. The method of claim 1, further comprising storing in a rules dictionary, a rule for identifying a request to access an application store by an application that executes on a mobile device, where each rule further includes an identifier for an event associated with the request to access an application store.

5. The method of claim 4, wherein the event includes at least one of a download, install, upload or a re-download event.

6. The method of claim 1, wherein detecting a third party application installation further comprises:
   extracting an icon from the advertisement; and
   comparing the icon extracted from the advertisement with an icon of an application installed on the mobile device.

7. A computer program product for attributing an application install on a device, the computer program product comprising a non-transitory computer-readable storage medium containing computer program code for: monitoring network traffic including network requests from one or more publisher applications on a mobile device, wherein the one or more publisher applications display an advertisement for a third-party application; detecting one or more impressions of the advertisement by determining that the network requests were made by one of the publisher applications to a network address associated with the advertisement; logging the detected impressions and their associated publisher applications; detecting an installation of the third-party application on the mobile device, wherein the installation is detected by: searching a rules dictionary for a rule having a regular expression that identifies a request to access an application store and applying the rule to the monitored network traffic to find a match; and identifying an installation event for the third-party application, from the matched monitored network traffic, by comparing an installation event identifier of the rule to the matched monitored network traffic; logging a time of the installation of the third-party application on the mobile device; determining an attribution of the installation of the third-party application to one or more of the impressions by applying an attribution model to the logged installation and the logged impressions; and reporting the determined attribution to an analytics engine.

8. The computer program product 7, wherein detecting an advertisement further includes detecting a network request to the mobile application displayed in the advertisement.

9. The computer program product 8, further comprising determining a landing page for the detected network request to the mobile application.

10. The computer program product 7, further comprising storing in a rules dictionary, a rule for identifying a request to access an application store by an application that executes on a mobile device, where each rule further includes an identifier for an event associated with the request to access an application store.

11. The computer program product 10, wherein the event includes at least one of a download, install, upload or a re-download event.

12. The computer program product 7, wherein detecting a third party application installation further comprises:
- extracting an icon from the advertisement; and
- comparing the icon extracted from the advertisement with an icon of an application installed on the mobile device.

\* \* \* \* \*

UNITED STATES PATENT AND TRADEMARK OFFICE
CERTIFICATE OF CORRECTION

PATENT NO. : 10,614,482 B2  
APPLICATION NO. : 15/587352  
DATED : April 7, 2020  
INVENTOR(S) : Mark Wilson Ungerer et al.

Page 1 of 1

It is certified that error appears in the above-identified patent and that said Letters Patent is hereby corrected as shown below:

In the Claims

Column 8, Claim 8, Line 56 change "The computer program product 7" to read as -- The computer product of claim 7 --
Column 8, Claim 9, Line 59 change "The computer program product 8" to read as -- The computer product of claim 8 --
Column 8, Claim 10, Line 62 change "The computer program product 7" to read as -- The computer product of claim 7--
Column 9, Claim 11, Line 1 change "The computer program product 10" to read as -- The computer product of claim 10 --
Column 9, Claim 12, Line 4 change "The computer program product 7" to read as -- The computer product of claim 7 --

Signed and Sealed this
Twenty-ninth Day of December, 2020

Andrei Iancu
*Director of the United States Patent and Trademark Office*